United States Patent

Dietrich

Patent Number: 6,055,442
Date of Patent: Apr. 25, 2000

[54] SHORT MESSAGE SERVICE FOR A MOBILE RADIO NETWORK

[75] Inventor: Hanno Dietrich, Paderborn, Germany

[73] Assignee: ORGA Kartensysteme GmbH, Paderborn, Germany

[21] Appl. No.: 08/983,315

[22] PCT Filed: Apr. 22, 1997

[86] PCT No.: PCT/DE97/00801

§ 371 Date: Mar. 5, 1998

§ 102(e) Date: Mar. 5, 1998

[87] PCT Pub. No.: WO97/42782

PCT Pub. Date: Nov. 13, 1997

[30] Foreign Application Priority Data

May 7, 1996 [DE] Germany ............. 196 18 218

[51] Int. Cl.⁷ .................................. H04B 1/38
[52] U.S. Cl. ............. 455/558; 455/466; 455/419
[58] Field of Search .................. 455/418, 419, 455/558, 559, 420, 466, 575

[56] References Cited

U.S. PATENT DOCUMENTS

| | | | |
|---|---|---|---|
| 5,418,837 | 5/1995 | Johansson et al. | 455/186.1 |
| 5,687,216 | 11/1997 | Svensson | 455/558 |
| 5,881,235 | 3/1999 | Mills | 455/419 |
| 5,887,253 | 3/1999 | O'Neill et al. | 455/418 |
| 5,915,225 | 6/1999 | Mills | 455/419 |

FOREIGN PATENT DOCUMENTS

| | | | |
|---|---|---|---|
| 0562890A1 | 9/1993 | European Pat. Off. | H04Q 7/04 |
| 0689368A1 | 12/1995 | European Pat. Off. | H04Q 7/22 |
| 94/30023 | 12/1994 | WIPO | H04Q 7/04 |

*Primary Examiner*—Nguyen Vo
*Assistant Examiner*—Greta J. Fuller
*Attorney, Agent, or Firm*—Cohen, Pontani, Lieberman & Pavane

[57] ABSTRACT

A mobile radio network comprising a plurality of mobile radio stations and at least one mobile radio exchange for controlling communication within a mobile radio network, the subscribers being identified with respect to the mobile radio network by means of a chip card (Subscriber Identity Module—SIM) which is inserted into the mobile radio station. The mobile radio network incorporates a short message service which transmits to the subscriber chip cards (SIM cards) data in a predetermined short message format containing a standardized header. The short messages can be of two types: (a) a conventional short message whose data only contain information for the subscriber which is temporarily stored in the subscriber chip card (SIM card) and can be displayed on a mobile radio station display; and (b) a reconfiguration short message which can reconfigure the subscriber chip card (SIM card) in given data fields. In order to recognize and differentiate between a reconfiguration short message and a conventional short message, the subscriber chip card contains a recognition and differentiation filter suited to the program, for evaluating the header of the short message.

7 Claims, 4 Drawing Sheets

SHORT MESSAGE SERVICE FOR A MOBILE RADIO NETWORK

BACKGROUND OF THE INVENTION

1. Field of the Invention

The present invention relates to a mobile radio network, and in particular to a GSM Standard (Global System for Mobile communication) network;

2. Description of Releted Art

A GSM a network comprises a large number of mutually adjacent and overlapping radio cells which extend over the entire network area. Located in each radio cell is a base transmitting and receiving station via which wire-free communication takes place with the subscribers' mobile radio stations (mobile radio telephone, car telephone). The information is in this case transmitted digitally, in coded form. A plurality of base stations are in turn driven by a so-called base station controller, of which there are a number in the mobile radio network. They control, inter alia, the switching of communication from one radio cell to an adjacent radio cell. The individual base station controllers are now, for their part, connected to a higher-level mobile radio center—the so-called mobile switching center (MSC). This mobile radio center is used, inter alia, as an interface between the mobile radio network and the wire-based telecommunications network.

Within the GSM mobile radio network, a subscriber identifies himself to the network with the aid of a smart card which is inserted into the mobile radio station. The subscriber identification and mobile radio station are thus de-coupled, to allow high flexibility. In order to prevent misuse of the card, the use of this card is linked to the entry of a personal identification number (PIN). This number is stored in the smart card, a PIN that has been entered being compared in the processor chip of the card with the PIN stored there. In the GSM Standard, this subscriber smart card is called a SIM card (Subscriber Identity Module).

In the so-called initialization and personality steps, which are carried out by the SIM card manufacturer and/or by the card issuing authority (for example the network operator, service provider), application-specific and/or personal data and programs are respectively loaded in the non-volatile EEPROM memory of the SIM card.

Within a GSM network it is possible to send short messages to the SIM card, which are then stored there and can be displayed on the mobile radio telephone display (e.g GSM 11.11 and GSM 3.40). After being displayed these short messages are deleted this service is referred to as the normal short message service. Short messages can be sent via a mobile radio center both to all subscribers or to a specific group of subscribers, and from subscriber A to subscriber B.

European patent 0562890 describe the use of the short message service for reconfiguration of a SIM card via the radio link, for example adding to or overwriting a telephone number directory stored in the SIM card. This so-called update short message (reconfiguration short message) has a different quality to that of a normal short message, where a message is stored only briefly and may be displayed on the mobile radio station display.

The object of the present invention therefore is to provide an efficient and reliable method by which a SIM card can distinguish between an update short message and a normal short message.

SUMMARY OF THE INVENTION

The present invention is directed to a mobile radio network having a large number of mobile radio stations and at least one mobile radio center for controlling communication within the mobile radio network. Subscribers identify themselves to the mobile radio network with the aid of a smart cart (Subscriber Identity Module SIM) which is inserted into a mobile radio station. The mobile radio network includes a short message service by means of which data is sent to the subscriber smart cards (SIM cards) in a predetermined short message format with a standardized data header contained in said format. Two types of short messages are provided: 1) a normal short message whose data contains only a message for the subscriber and which message is temporarily stored in the subscriber smart card (SIM card) and can be displayed on a mobile radio station display; and 2) a reconfiguration short message that can reconfigure specific data fields in the subscriber smart card (SIM card). The subscriber smart card includes a programmable filter for identifying a reconfiguration short message and distinguishing the reconfiguration short message from a normal short message by evaluating the data header associated with the short message.

In another embodiment of the present invention one or more origin addresses are allocated in the mobile radio network and are stored on all of the subscriber smart cards (SIM cards) or only on specific subscriber smart cards (SIM cards), in which reconfiguration short messages may be produced only by these origin addresses. The programmable identification and distinguishing filter in the subscriber smart card (SIM card) compares the origin address in each case contained in the data header with the stored origin address or addresses and reconfiguration of the subscriber smart card (SIM card) is inhibited if no match exists. The reconfiguration short message is used in the subscriber smart card (SIM card) to generate a short message which can be displayed on a mobile radio station display.

DETAILED DESCRIPTION OF THE PRESENTLY PREFERRED EMBODIMENTS

Figure 1:
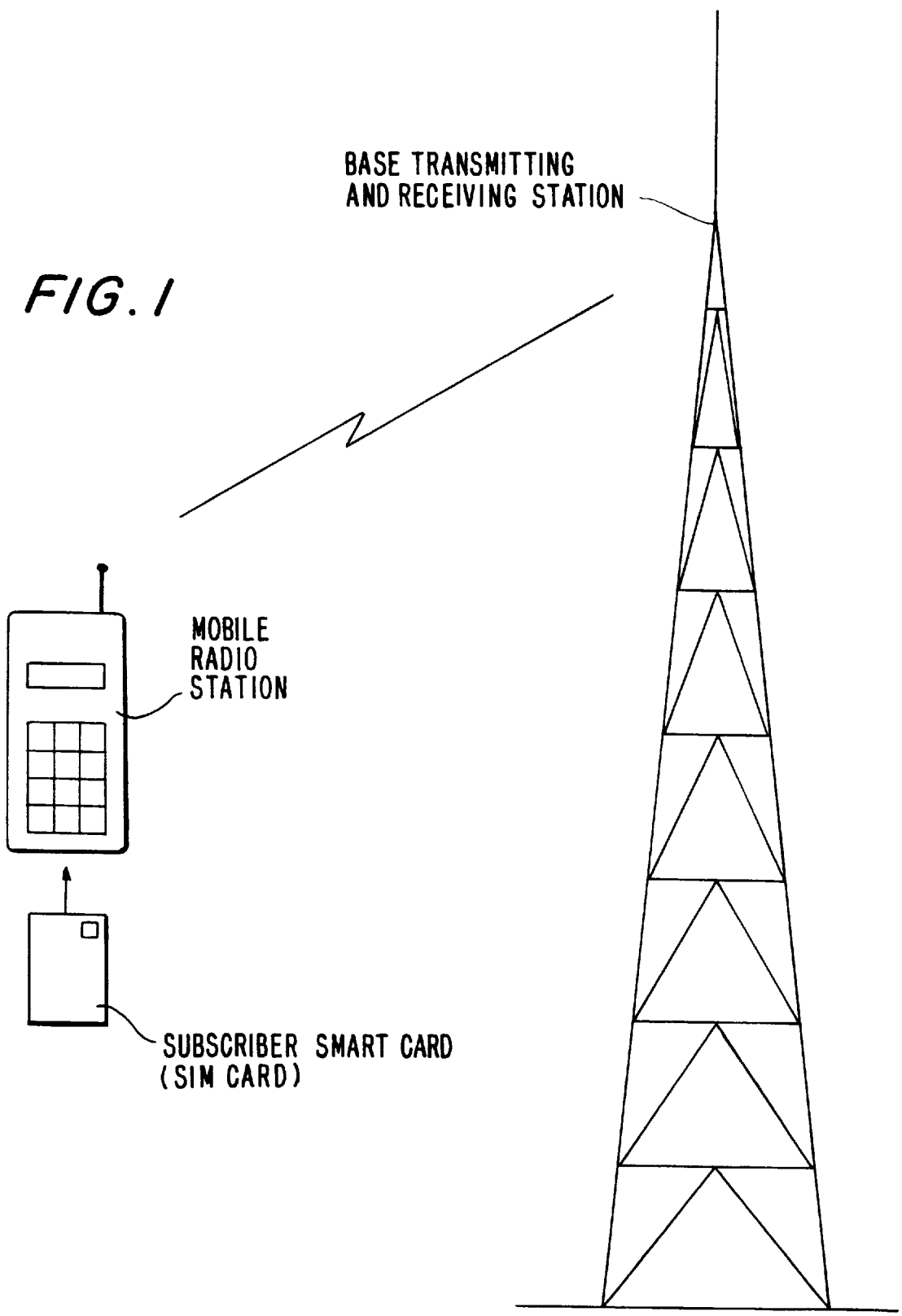
FIG. 1 shows a base transmitting and receiving station for setting up the radio link to the mobile radio stations.
Figure 2:
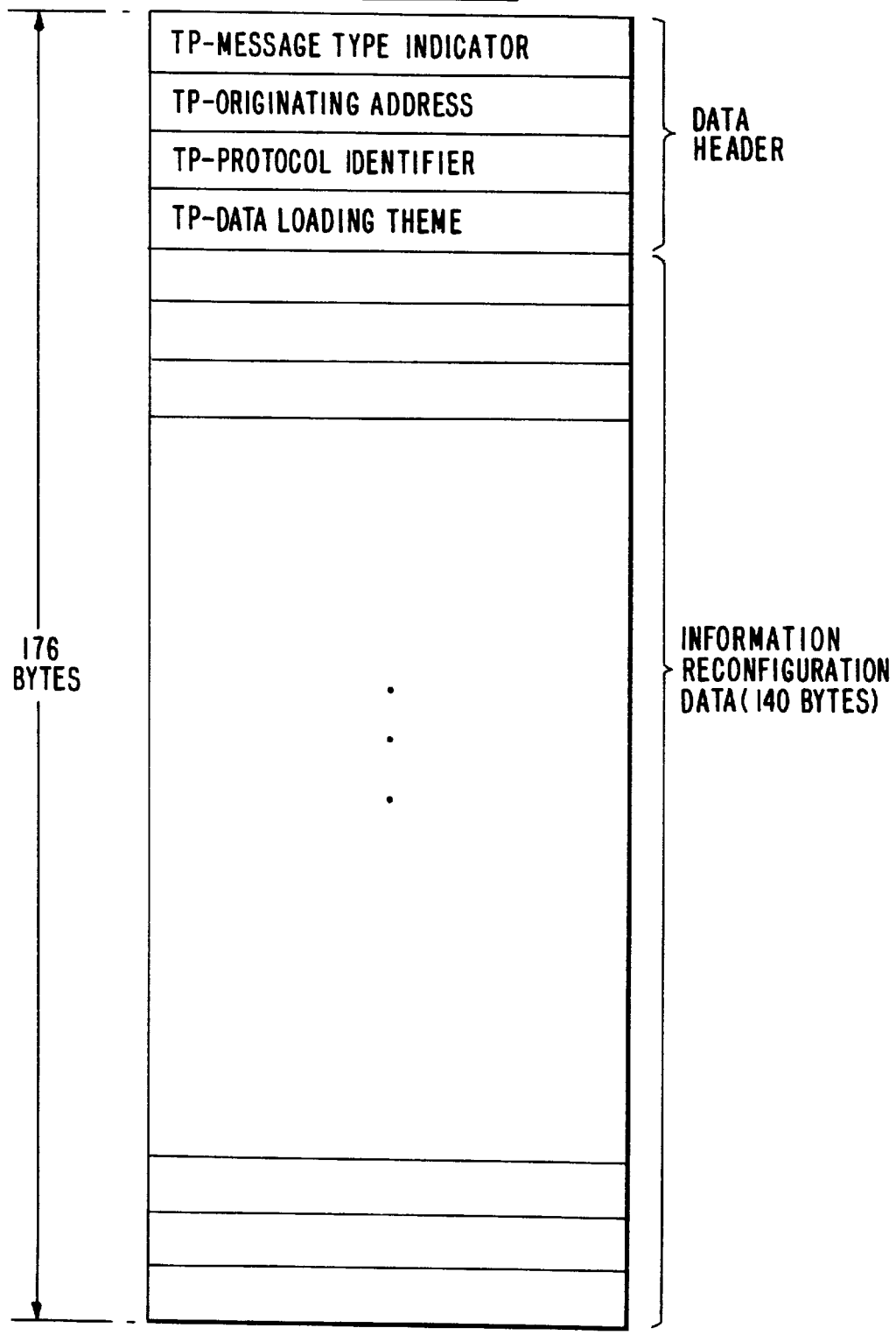
FIG. 2 is a standard data format of a short message.

FIG. 1 shows a base transmitting and receiving station for

The SIM CARD includes special program as an identification and distinguishing filter which evaluates the data header on the basis of specific criteria in order to distinguish between a normal short message and an update short message (reconfiguration short message).

Figure 3:
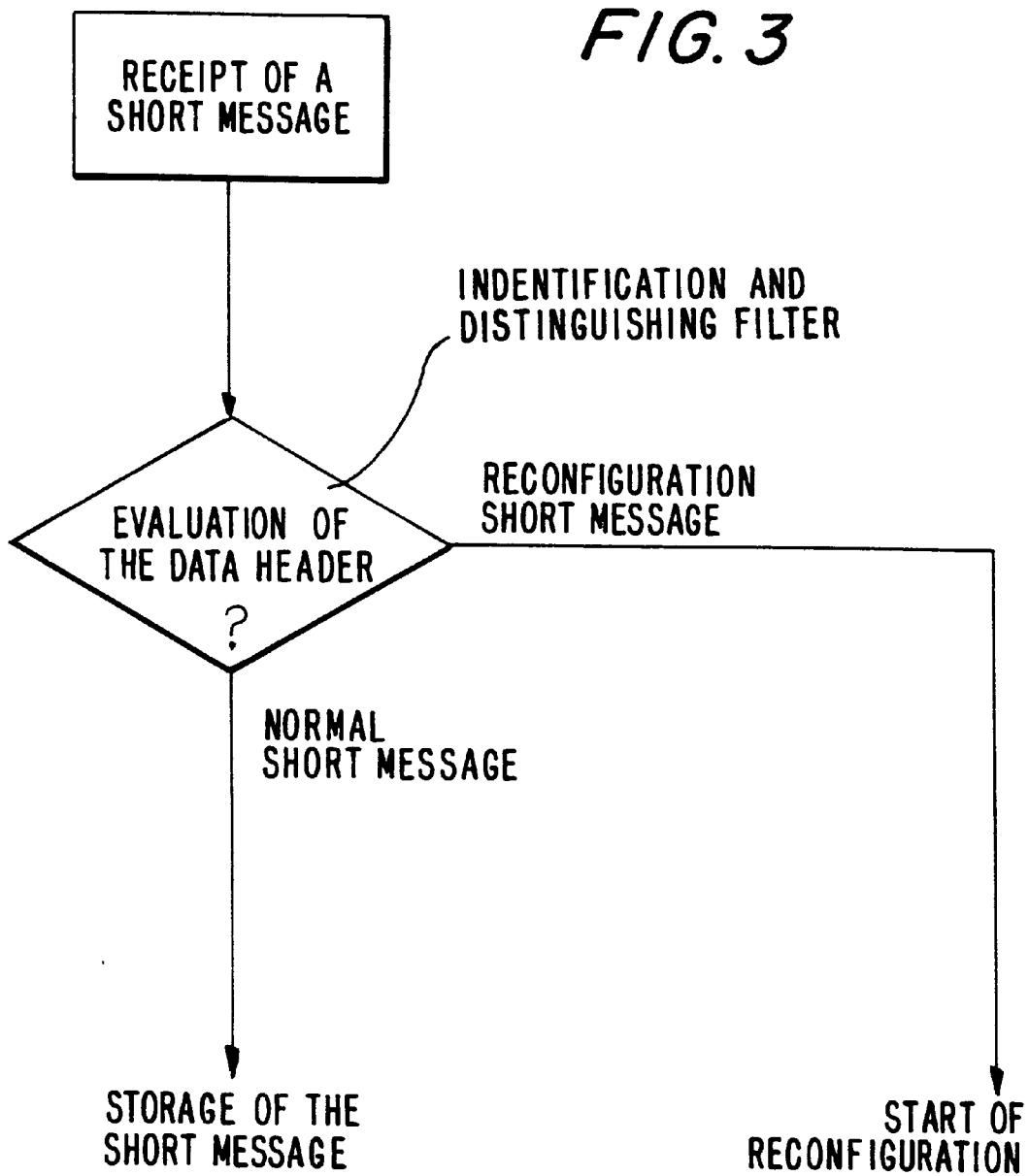
FIG. 3 is a flowchart of the evaluation of the data header using an identification and distinguishing filter.

In this way, it is possible to dispense with any identification code in addition to the data header within the short this is a normal short message or an update short message. Dispensing with an additional identification code in an update short message allows the update short message to contain the maximum amount of data for information and/or reconfiguration data. As shown in FIG. 3, the implementation according to the invention of an identification and distinguishing filter for evaluation of the data header ensures reliable distinction, since the elements in the data header in the case of an update short message differ in a unique manner from those in a normal short message.

Figure 4:
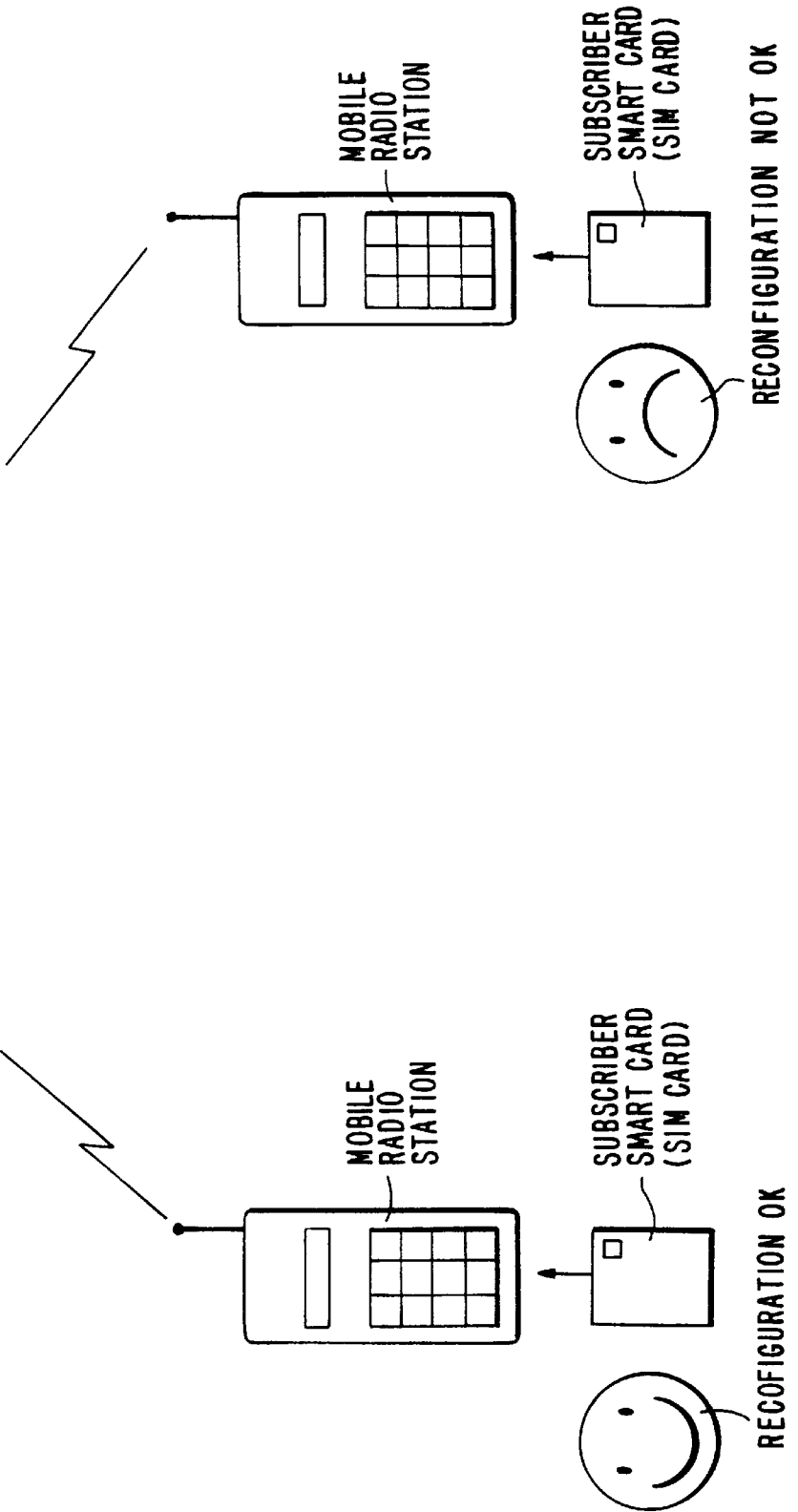
FIG. 4 is another embodiment of the present invention using origin addresses for controlling authorization of reconfiguration short messages.

A particularly reliable refinement of the invention provides for one or more special origin addresses to be allocated in the mobile radio network as shown FIG. 4. Reconfiguration short messages may be sent only by these origin addresses, and these origin addresses are in turn stored on the subscriber smart cards of all subscribers, or specific subscribers. This may be done during card initialization and/or personalization. The programmable identification and distinguishing filter in the SIM card compares the origin address in each case contained in the data header with the stored origin address or addresses. If there is no match, reconfiguration of the SIM card is inhibited. This prevents a subscriber smart card from being reconfigured by agencies not authorized to do—cf.

One embodiment of the invention provides for the SIM card to use a reconfiguration short message to generate a "normal" short message which is displayed on the mobile radio station display. Such a short message may be, for example, "reconfiguration OK" or "telephone number directory amended".

I claim:

1. A mobile radio network including a plurality of mobile radio stations and having at least one mobile radio center for controlling communication within the mobile radio network, said mobile radio network comprising:

a subscriber smart card for identifying each user, said subscriber smart card being insertable into said mobile radio stations;

means for generating a short message having a predetermined short message format including a standardized data header and sending the short message to said subscriber smart card, wherein the short message is one of a normal short message only for a subscriber which is temporarily stored in said smart card and displayed on a mobile radio station display, and a reconfiguration short message for reconfiguring specific data fields in said subscriber smart card; and a programmable filter disposed in said smart card for identifying a reconfiguration short message and distinguishing a reconfiguration short message from a normal short message based on the data header associated with the short message.

2. The mobile radio network in accordance with claim 1, wherein said subscriber smart card associated with at least one of all of the subscribers and only specific subscribers stores at least one origin address allocated in the mobile radio network, and wherein reconfiguration short messages are produced only when said programmable filter in said subscriber smart card identifies a match between the data header with the stored origin address.

3. The mobile radio network in accordance with claim 1, wherein said subscriber smart card uses the reconfiguration short message to generate a short message and display the short message on the mobile radio station display.

4. The mobile radio network in accordance with claim 1, wherein said subscriber smart card comprises a subscriber identity module.

5. A method for distinguishing between a normal short message and a reconfiguration short message in a mobile radio network including a plurality of mobile radio stations and having at least one mobile radio center for controlling communication within the mobile radio network, said method comprising the steps of:

(a) inserting a subscriber smart card into said mobile radio station for identifying each user;

(b) generating a short message having a predetermined short message format including a standardized data header and sending the generated short message to said smart card, wherein the short message is one of a normal short message only for a subscriber which is temporarily stored in said smart card and displayed on a mobile radio station display, and a reconfiguration short message for reconfiguring specific data fields in said subscriber smart card; and (c) identifying a reconfiguration short message and distinguishing the reconfiguration short message from a normal short message based on the data header associated with the short message using a programmable filter disposed in said smart card.

6. The method in accordance with claim 5, wherein step (c) comprises the steps of:

(d) storing at least one origin address allocated in the mobile radio network to the subscriber smart card associated with at least one of all of the subscribers and only specific subscribers; and (e) comparing the data header of the short message with the stored origin address, wherein if the data header matches the stored origin address further comprising the step of producing the reconfiguration short messages, and if the data header does not match the stored origin address further comprising the step of inhibiting reconfiguration of the subscriber smart card.

7. The method in accordance with claim 5, further comprising the steps of:

(f) generating a short message using the reconfiguration short message in the subscriber smart card; and (g) displaying the generated short message on the mobile radio station display.

* * * * *